(12) United States Patent
Joung et al.

(10) Patent No.: US 11,567,224 B2
(45) Date of Patent: Jan. 31, 2023

(54) APPARATUS FOR ANALYZING AND MEASURING NUCLIDES AND CONCENTRATION THEREOF IN RADIOACTIVE WASTE

(71) Applicant: NuCare, Inc., Chungcheongbuk-do (KR)

(72) Inventors: Jinhun Joung, Incheon (KR); Yongkwon Kim, Chuncheongnam-do (KR)

(73) Assignee: NuCare, Inc., Chungcheongbuk-do (KR)

( * ) Notice: Subject to any disclaimer, the term of this patent is extended or adjusted under 35 U.S.C. 154(b) by 78 days.

(21) Appl. No.: 17/320,548

(22) Filed: May 14, 2021

(65) Prior Publication Data

US 2021/0405229 A1    Dec. 30, 2021

(30) Foreign Application Priority Data

Jun. 24, 2020    (KR) .................. 10-2020-0077111

(51) Int. Cl.
*G01T 1/02* (2006.01)
*G01T 1/178* (2006.01)
*G01T 7/02* (2006.01)

(52) U.S. Cl.
CPC ............ *G01T 7/02* (2013.01); *G01T 1/178* (2013.01)

(58) Field of Classification Search
CPC ................... G01T 7/02; G01T 1/178
See application file for complete search history.

(56) References Cited

U.S. PATENT DOCUMENTS 6,624,425 B2 * 9/2003 Nisius .................. G01N 23/046
250/363.01

FOREIGN PATENT DOCUMENTS

| JP | H05333155 | A | * | 5/1992 | |
|---|---|---|---|---|---|
| JP | H06258496 | A | * | 3/1993 | |
| JP | H05333155 | A | | 12/1993 | |
| JP | 2017138138 | A | | 8/2017 | |
| JP | 2020046327 | A | | 3/2020 | |
| KR | 20180050016 | A | * | 11/2016 | ............ G01T 1/169 |
| KR | 101892569 | B1 | * | 8/2017 | ............ G01T 7/00 |
| KR | 20180050016 | A | | 5/2018 | |

* cited by examiner

*Primary Examiner* — David P Porta
*Assistant Examiner* — Fani Polyzos Boosalis
(74) *Attorney, Agent, or Firm* — Levenfeld Pearlstein, LLC

(57) ABSTRACT

An apparatus for analyzing nuclides and the concentration thereof in waste contained in a radioactive waste packaging container according to the present disclosure relates to an apparatus that has detector devices located above/under the waste packaging container and performs nuclide and concentration analysis on the waste in the packaging container by scanning the packaging container in the longitudinal direction thereof using a forward/backward driving device. In particular, upper/lower detector modules are equipped with multiple high-resolution gamma ray detectors to increase inspection efficiency, each module is designed to be driven up/down, and each detector in the module is designed to be driven left/right, thereby performing nuclide and concentration analysis on various types of packaging containers regardless of the size thereof.

11 Claims, 5 Drawing Sheets

APPARATUS FOR ANALYZING AND MEASURING NUCLIDES AND CONCENTRATION THEREOF IN RADIOACTIVE WASTE

BACKGROUND OF THE INVENTION

1. Field of the Invention

The present disclosure relates to an apparatus capable of measuring radiation emitted by contents of a packing container, regardless of the size of the packing container, in the case where a large amount of waste generated in the process of decommissioning a nuclear power plant is processed using various types and sizes of packing containers including large-capacity packing containers, in addition to existing standard drum packing containers, and, in particular, relates to an apparatus for analyzing radiation nuclides contained in the waste and quantitatively measuring the concentration of the analyzed nuclides in a non-destructive manner without opening the packing container.

2. Description of the Prior Art

Radioactive waste generated in large quantities is broadly classified into operational waste and decommissioning waste. Operational waste is generated during the operation of a nuclear power plant or is generated in the process of using radioactive isotopes in hospitals or other institutions. Decommissioning waste is generated in the process of decommissioning a nuclear power plant after the power plant is shut down due to the end of its service life. Unlike general operational waste, decommissioning waste is characterized in that waste containing, for example, concrete, metal, and the like is generated in large quantities in a short period of time.

In recent years, in order to decommission domestic nuclear power plants, starting with Kori power plant 1, which was shut down at the end of its life, the disposal of radioactive decommissioning waste has become a very important issue.

Radioactive waste is classified, packed, transported, and disposed according to the level of radiation pursuant to regulatory guidelines and acceptance criteria. In this case, radioactive waste packing containers are regulated to satisfy general requirements, such as analysis of nuclides and concentration, size/weight, and the like, solidification requirements, physical/chemical characteristics, and the like as delivery/acceptance criteria required by disposal sites according to classification criteria.

In particular, since analysis of nuclides and the concentration thereof is a standard for classification and self-disposal of decommissioning waste, accurate measurement and analysis is very important.

In Korea, to date, a standardized drum container of 200 liters or 320 liters has been used as a standard for the radioactive waste packing container, and equipment for performing non-destructive nuclide analysis on such a standardized container is very well established and operated in each nuclear power plant, which is a generator of radioactive waste, and in the Nuclear Environment Corporation, which is a disposal facility.

However, the waste generated during the decommissioning of nuclear power plants contains a large amount of concrete, soil, and metal, and the waste is generated in massive quantities, so the use of a drum container of 200 liters or 300 liters, which is the current standard, is problematic from the aspect of efficiency/economics. Therefore, in general, packing containers of various sizes and usages are used for the disposal of decommissioning waste, extending to ISO container sizes in some cases.

The present disclosure relates to an apparatus that is applied to non-destructive nuclide analysis and concentration measurement for decommissioning waste held in a large container, specifically extending to ISO container sizes, and is further applied to the analysis of packing containers of other sizes and usages.

SUMMARY OF THE INVENTION

As described above, among radioactive waste, waste that is generated in large quantities, in particular decommissioning waste, is packed in large containers, extending to ISO container sizes, or containers of various sizes for other usages.

Therefore, the present disclosure provides a non-destructive measurement apparatus capable of nuclide analysis and concentration analysis regardless of the size of a container in the case where decommissioning waste generated when decommissioning a nuclear power plant is packed in containers of various sizes and is then disposed.

According to the configurations to solve the problems described above, the present disclosure has the following effects.

The present disclosure has the effect of performing nuclide analysis on packing containers of various sizes using one system by adjusting the position of a detector module included in a nuclide analysis apparatus depending on the sizes and characteristics of various packing containers in which the decommissioning waste is held.

In addition, the data measured by the upper and lower detector modules are collected in opposite directions at 180 degrees by the same number of detectors, which form respective pairs, and is very useful information for attenuation correction in consideration of the above characteristic.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
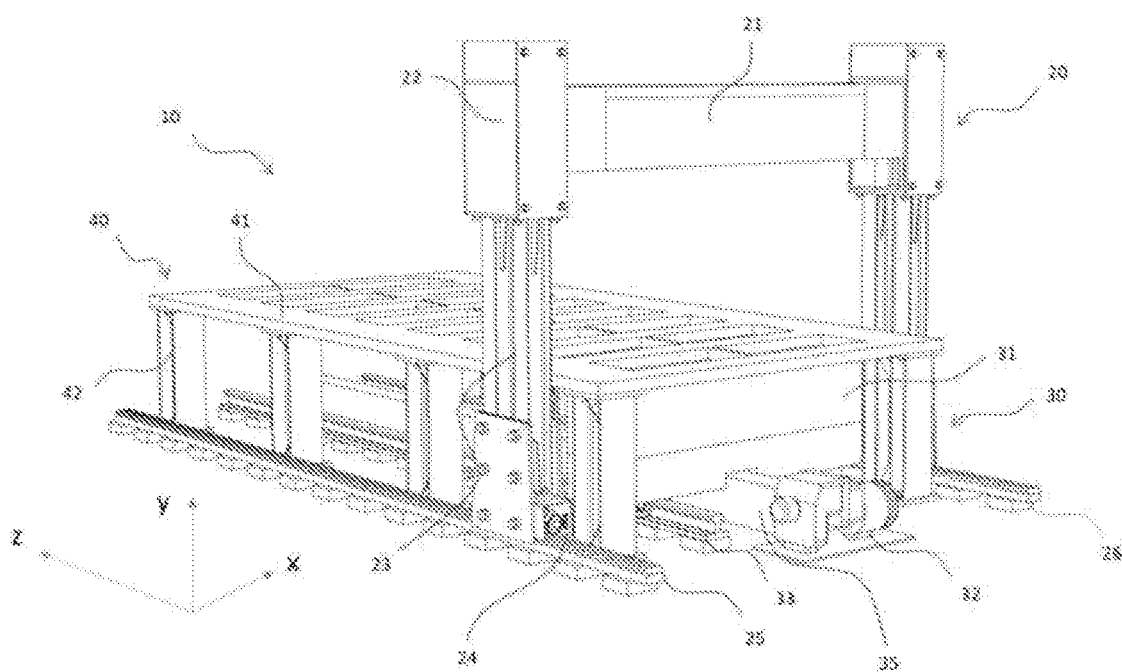
FIG. 1 is a perspective view illustrating a measurement apparatus for performing non-destructive nuclide and concentration analysis on a large-capacity radioactive waste packing container according to the present disclosure.

Hereinafter, a preferred embodiment of a radioactive waste packing container nuclide analysis apparatus according to the present disclosure will be described in detail with reference to the accompanying drawings. For reference, terms and words used in the present specification and claims should not be construed as being limited to their usual or dictionary meanings, but should be interpreted as having meanings and concepts conforming to the technical idea of the present disclosure on the basis of the principle in which the inventors are entitled to appropriately define the concept of terms in order to explain their own disclosure in the best way. In addition, the embodiments described in the present specification and the configurations shown in the drawings are only the most preferred embodiments of the present disclosure, and do not represent all the technical ideas of the present disclosure. Thus, it should be understood that there may be equivalents and variations capable of replacing the same.

FIG. 1 is a perspective view illustrating a measurement apparatus for performing non-destructive nuclide and concentration analysis on a large-capacity radioactive waste packing container according to the present disclosure.

A measurement apparatus 10 for performing non-destructive nuclide and concentration analysis on a radioactive waste packing container according to the present disclosure, as shown in FIG. 1, primarily includes an upper detector device 20, a lower detector device 30, and a container inspection table 40. The upper detector device may be located above the radioactive waste packing container, and may include a plurality of radiation detectors, thereby detecting radiation emitted from waste inside the packing container. In addition, the lower detector device may be located under the packing container, and may include a plurality of radiation detectors, thereby detecting radiation emitted from the waste inside the packing container.

The upper detector device 20 may include an upper detector module 21, an up/down driving part 22 for the upper detector module, an upper detector module support 23, a forward/backward driving part 24 for the upper detector module, and first guide rails 25 and 26 for the upper detector device.

Figure 3:
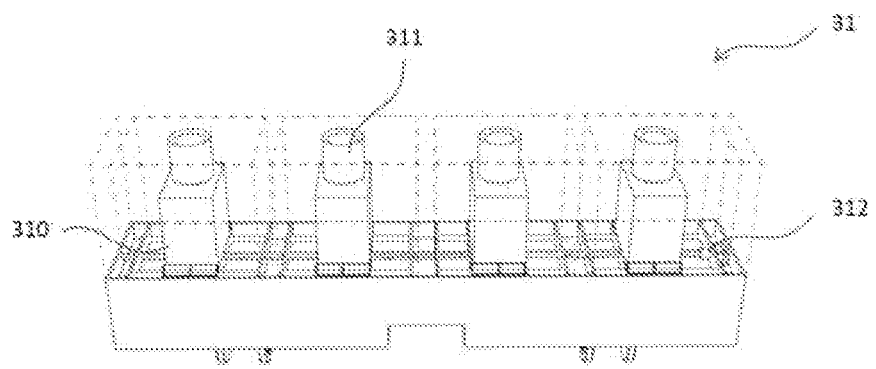
FIG. 3 is a schematic diagram illustrating the inside of upper/lower detector modules of a radioactive waste packing container nuclide analysis apparatus in which radiation detectors are mounted together with collimators according to the present disclosure.

FIG. 3 is a schematic diagram illustrating the inside of upper/lower detector modules of a radioactive waste packing container nuclide analysis apparatus in which radiation detectors are mounted together with collimators according to the present disclosure.

Although FIG. 3 illustrates the lower detector module 31, the upper detector module 21 has the same structure as the lower detector module 31. Therefore, the upper detector module 21 will be described below with reference to FIG. 3. At least one of the upper detector module 21 and the lower detector module 31 may be surrounded by a shield so as to be shielded from background radiation. Accordingly, at least one of the upper detector module 21 and the lower detector module 31 is able to measure only the radiation emitted from the waste packing container 50 or 60.

The upper detector module 21 may include a plurality of radiation detectors 310 as shown in FIG. 3, and each detector may be equipped with a collimator 311. The at least one radiation detector 310 may be a plurality of gamma ray detectors. The radiation detector 310 measures radiation generated from the radioactive waste held in the waste packing container 50 or 60 to recognize a radiation nuclide in the waste, and determines the concentration of the detected nuclide, that is, the amount of radiation per unit weight (Bq/g). In order to improve the efficiency of radiation detection, the upper detector module 21 includes a plurality of radiation detectors 310. In this case, the most preferable radiation detector 310 may be a high-pressure germanium (HPGe) detector having the best energy resolution among commercially available gamma ray detectors. However, it is also possible to use radiation detectors based on other scintillators. Each radiation detector 310 is equipped with a collimator 311 that serves to limit the useful field of view (FOV) of the detector. Accordingly, each detector collects gamma rays in a limited area determined through the collimator 311.

In addition, the upper detector module 21 may include a left/right driving part 312 that drives each detector 310 to the left/right (e.g., in the x-axis direction). The left/right driving part 312 may move at least one of the plurality of radiation detectors 310 in the upper detector module 21 to the left/right. The left/right driving part 312 may move at least one of the plurality of radiation detectors 310 to an optimal position depending on the width of the measurement container. That is, the left/right driving part may move at least one of the plurality of radiation detectors 310 to the left/right, thereby locating the same at the optimal position for data collection.

Referring back to FIG. 1, the upper detector device 20 includes the up/down driving part 22, and the up/down driving part 22 moves the upper detector module 21 up/down (e.g., in the y-axis direction), thereby positioning the upper detector module 21 at the optimal height for performing the inspection depending on the height of the measurement container.

The forward/backward driving part 24 is a driving device necessary for driving the upper detector device 20 forwards/backwards (e.g., in the z-axis direction), and makes the upper detector device 20 move in the z-axis direction and scan the packing container. Here, the z-axis direction may be the longitudinal direction of the packing container. The upper detector device 20 may collect radiation emitted from the waste in the packing container while moving forwards/backwards in the longitudinal direction of the packing container (e.g., the z-axis direction) fixed to the container inspection table 40. However, the present disclosure is not limited thereto, and alternatively, the container inspection table may move the packing container in consideration of a moving path thereof while the upper detector device is fixed, thereby obtaining the same measurement effect.

The first guide rails 25 and 26 of the upper detector device guide the forward/backward movement of the upper detector device along a specified track, and are preferably designed to have gears so as to be driven through the forward/backward driving part 24 and the gears.

Figure 2:
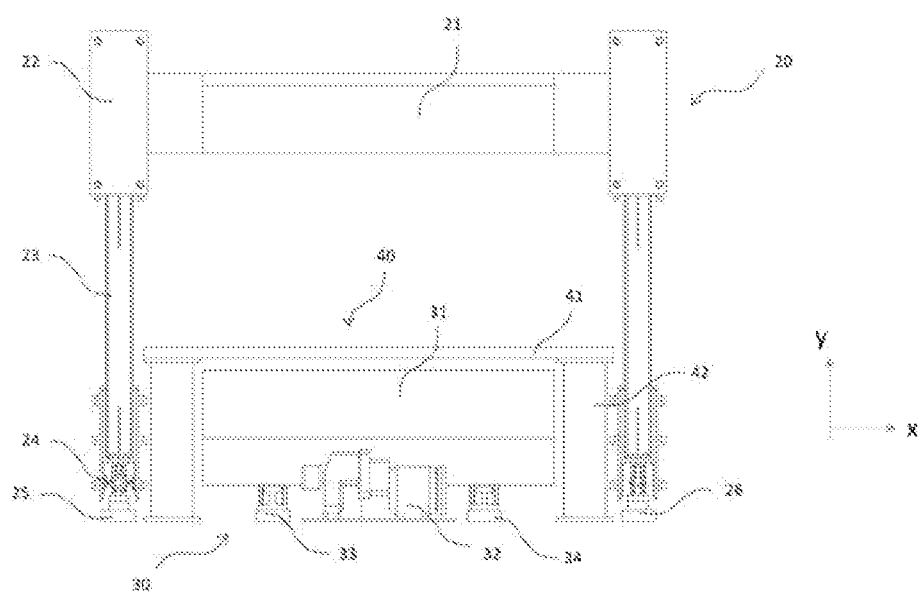
FIG. 2 is a front view of the measurement apparatus in FIG. 1.

FIG. 2 is a front view of the measurement apparatus in FIG. 1. The lower detector device 30 may include a lower detector module 31, a forward/backward driving part 32 for the lower detector device, a forward/backward driving rail 35 of the lower detector, and second guide rails 33 and 34 for the lower detector.

The lower detector module 31 has the same structure as the upper detector module 21 and may also include a plurality of radiation detectors 310, a left/right driving part 312 for the detectors, and collimators 311. A description of the lower detector module 31, which is the same as the description of the upper detector module 21, will be omitted below. The lower detector module 31 has the same structure as the upper detector module 21, which facilitates maintenance thereof.

It is preferable that the upper/lower detector modules include the same number of detectors 310 and that the respective detectors be configured in pairs so as to face each other. At least one of the plurality of radiation detectors included in the upper detector device may be paired with at least one of the plurality of radiation detectors included in the lower detector device so as to face each other.

The upper detector module 21 may be movably installed on the first guide rails 25 and 26. The lower detector module 31 may be movably installed on the second guide rails 33 and 34. The upper detector module 21 and the lower detector module 31 may move forwards/backwards in synchronization with each other. However, the present disclosure is not limited thereto, and the upper detector module 21 and the lower detector module 31 may move forwards/backwards independently of each other, thereby measuring radiation.

The difference in forward/backward driving between the lower detector device 30 and the upper detector device 20 is as follows. The lower detector device 30 is characterized in that the forward/backward driving part 32 and the forward/backward driving rail 35 for the lower detector device are located in the center thereof and that the second guide rails 33 and 34 for the lower detector are to the left/right of the forward/backward driving rail 35, whereby the lower detector device moves along a predetermined path.

The lower detector device 30 may collect radiation emitted from the waste in the packing container while moving forwards/backwards in the longitudinal direction of the packing container (e.g., the z-axis direction) fixed to the container inspection table 40. However, the present disclosure is not limited thereto, and alternatively, the container inspection table may move the packing container in consideration of a moving path thereof while the lower detector device is fixed, thereby obtaining the same measurement effect.

Referring to FIG. 3, the lower detector module 31 may include a plurality of radiation detectors 310 as illustrated in FIG. 3, and each detector may be equipped with a collimator 311. At least one radiation detector 310 may be a plurality of gamma ray detectors. The radiation detector 310 detects radiation generated from the radioactive waste held in the waste packing container 50 or 60 to recognize a radiation nuclide in the waste, and determines the concentration of the detected nuclide, that is, the amount of radiation per unit weight (Bq/g). In order to improve the efficiency of radiation detection, the upper detector module 21 includes a plurality of radiation detectors 310. In this case, the most preferable radiation detector 310 may be a high-pressure germanium (HPGe) detector having the best energy resolution among commercially available gamma ray detectors. However, it is also possible to use radiation detectors based on other scintillators. Each radiation detector 310 is equipped with a collimator 311 that serves to limit the useful field of view (FOV) of the detector. Accordingly, each detector collects gamma rays in a limited area determined through the collimator 311.

In addition, the lower detector module 31 may include a left/right driving part 312 that drives each detector 310 to the left/right (e.g., in the x-axis direction). The left/right driving part 312 may move at least one of the plurality of radiation detectors 310 in the lower detector module 31 to the left/right. The left/right driving part 312 may move at least one of the plurality of radiation detectors 310 to the optimal position depending on the width of the measurement container. That is, the left/right driving part may move at least one of the plurality of radiation detectors 310 to the left/right, thereby locating the same at the optimal position for data collection.

Referring to FIG. 2, the lower detector device 30 may include an up/down driving part. The up/down driving part of the lower detector device 30 is characterized by moving the lower detector module 31 up/down (e.g., in the y-axis direction) and thus positioning the lower detector module 31 at the optimal height for performing inspection depending on the height or depth of the measurement container.

The container inspection table 40 may serve as a support for supporting the waste packing container. The container inspection table 40 may include an inspection table top plate 41 and an inspection table support 42. The packing container 50 or 60 is placed on the inspection table top plate 41, and in this case, the structure of the inspection table top plate 41 may be appropriately designed to minimize attenuation of gamma rays.

The inspection table support 42 is an element for supporting the measurement container, and may be designed to withstand the weight of the packing container 50 or 60 in consideration of the maximum load thereof.

Figure 4:
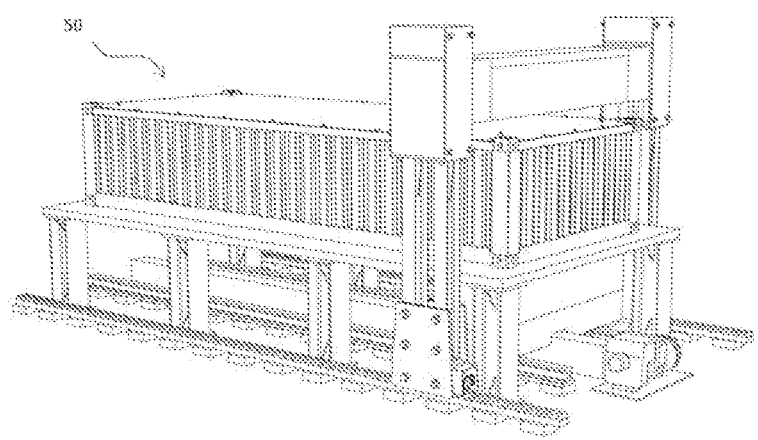
FIG. 4 is a diagram illustrating a first embodiment of a radioactive waste packing container nuclide analysis apparatus in the state in which a large-capacity packing container is placed on an inspection table according to the present disclosure.
Figure 5:
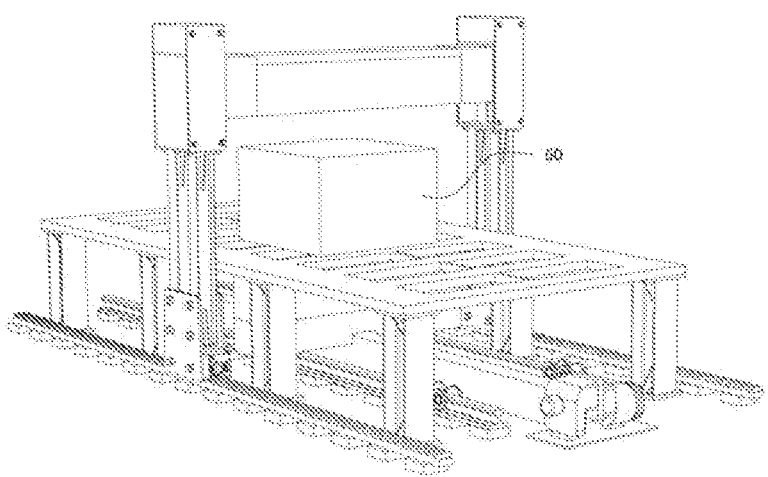
FIG. 5 is a diagram illustrating a second embodiment of a radioactive waste packing container nuclide analysis apparatus in the state in which a small-capacity packing container is placed on an inspection table according to the present disclosure.

FIG. 4 is a diagram illustrating a first embodiment of a radioactive waste packing container nuclide analysis apparatus in the state in which a large-capacity packing container is placed on an inspection table according to the present disclosure. In addition, FIG. 5 is a diagram illustrating a second embodiment of a radioactive waste packing container nuclide analysis apparatus in the state in which a small-capacity packing container is placed on an inspection table according to the present disclosure.

FIG. 4 shows the state in which a large packing container 50 is placed on the inspection table. FIG. 5 shows the state in which a packing container 60 having an arbitrary size is placed on the inspection table. As shown in FIGS. 4 and 5, the upper detector device and the lower detector device may accurately measure the radiation emitted from the packing container regardless of the size of the packing container while moving forwards/backwards, left/right, or up/down.

The present disclosure described above is not limited to the above-described embodiments and the accompanying drawings, and it will be obvious to those of ordinary skill in the art that various substitutions, modifications, and changes are possible within the scope of the technical spirit of the present disclosure.

What is claimed is:
1. An apparatus for analyzing and measuring nuclides of radioactive waste in a radioactive waste packaging container, the apparatus comprising:
   an upper detector device positioned above the radioactive waste packaging container, comprising a plurality of radiation detectors, and configured to detect radiation emitted from the waste in the packaging container;
   a lower detector device positioned under the packaging container, comprising a plurality of radiation detectors, and configured to detect radiation emitted from the waste in the packaging container; and
   a container inspection table serving as a support for supporting the waste packaging container,
   wherein the upper detector device comprises:
   an upper detector module comprising a plurality of radiation detectors;
   an up/down driving part for the upper detector module;
   an upper detector module support; and
   a forward/backward driving part for the upper detector device, wherein the lower detector device comprises:
a lower detector module comprising a plurality of radiation detectors; and
a forward/backward driving part for the lower detector device,
wherein the upper detector module and the lower detector module comprise a left/right driving part, and
wherein the left/right driving part is configured to
move at least one of the plurality of radiation detectors of the upper detector module and at least one of the plurality of radiation detectors of the lower detector module to the left/right, and
move at least one of the plurality of radiation detectors of the upper detector module and at least one of the plurality of radiation detectors of the lower detector module to an optimal position depending on a width of the packaging container, thereby performing detection.

2. The apparatus of claim 1, wherein the container inspection table comprises:
an inspection table top plate on which a measurement container is placed; and
a container support configured to support the measurement container.

3. The apparatus of claim 1, wherein at least one of the upper detector device and the lower detector device collects radiation emitted from the waste in the packaging container while moving forwards/backwards in a longitudinal direction of the packaging container, which is fixed to the container inspection table.

4. The apparatus of claim 3, wherein the container inspection table moves the packaging container in consideration of a moving path thereof while the upper detector device or the lower detector device is fixed, thereby obtaining the same measurement effect.

5. The apparatus of claim 1, wherein at least one of the plurality of radiation detectors included in the upper detector device is paired with at least one of the plurality of radiation detectors included in the lower detector device so as to face each other.

6. The apparatus of claim 1, wherein the upper detector module is movably installed on a first guide rail,
wherein the lower detector module is movably installed on a second guide rail, and
wherein the upper detector module and the lower detector module are synchronized with each other in forward/backward movement thereof.

7. The apparatus of claim 1, wherein at least one of the upper detector module and the lower detector module is driven up/down to move to an optimal position depending on a height of the packaging container, thereby performing detection.

8. The apparatus of claim 1, wherein at least one detector included in at least one of the upper detector module and the lower detector module comprises a detector capable of measuring gamma rays.

9. The apparatus of claim 1, wherein at least one detector included in at least one of the upper detector module or the lower detector module comprises a detector capable of HPGe-based high-energy resolution measurement.

10. The apparatus of claim 1, wherein at least one detector included in at least one of the upper detector module or the lower detector module is equipped with a collimator and is configured to define a useful field of view (UFOV).

11. The apparatus of claim 1, wherein at least one of the upper detector module and the lower detector module is shielded from background radiation by being surrounded by a shield.

* * * * *